United States Patent Office

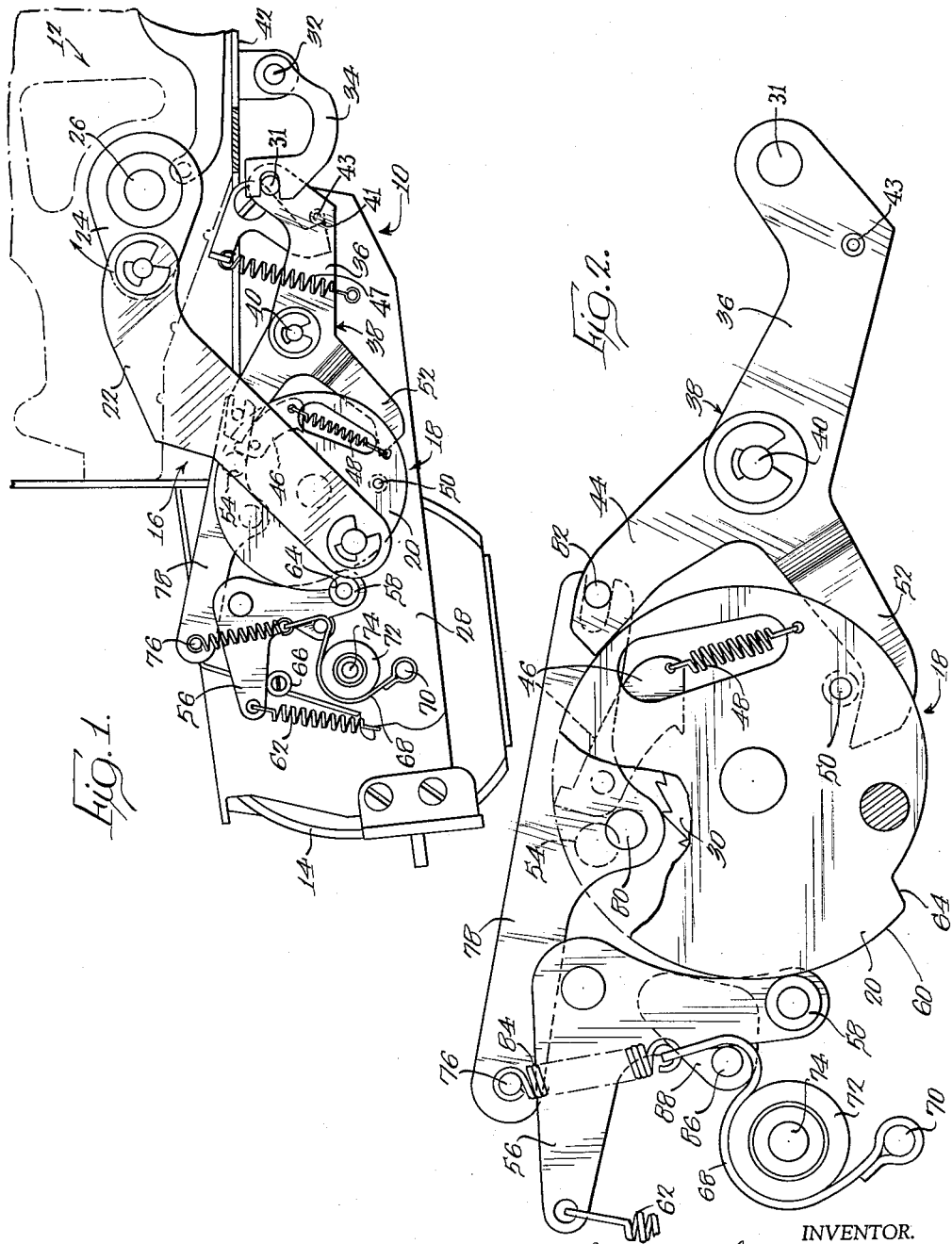

2,995,227
Patented Aug. 8, 1961

1

2,995,227
INTERMITTENTLY ENERGIZED BUSINESS MACHINE
James G. Woodier, Chicago, Ill., assignor to Victor Adding Machine, Co., a corporation of Illinois
Filed Jan. 13, 1958, Ser. No. 708,593
5 Claims. (Cl. 192—12)

The present invention relates to electrically powered business machines which operate intermittently in cycles that are basically independent of each other. It is common practice to power such machines with electric motors which are energized at the beginning of each operating cycle and deenergized at the end of the cycle, except when energization of a motor is continued throughout a continuous series of operating cycles.

The motor used to drive a machine of this character must have sufficient power or performance capacity to operate from a standing start to quickly drive the machine through its operating cycle. The matter of obtaining the desired performance from motors used in this service has been complicated by another operational requirement which is important from the standpoint of the practical acceptability of the machine. That requirement is that the driving motor for a machine stop quickly at the end of an operating cycle. Continued coasting of the driving motor after completion of an operating cycle produces undesirable noise and vibration.

Since the tendency of a motor to coast after being deenergized is generally proportional to the rotary moment of inertia of its rotor, it has been advantageous to obtain the power requirements of this service from motors so designed that the inertia of the rotors is minimized. For this reason, use has been made of motors having externally powered wound rotors.

One object of the invention is to provide an improved business machine of the above character in which improved driving means provides not only highly efficient energization of each individual operating cycle of the machine, but includes means for rapidly braking the motor to a stop at the end of each operating cycle, or at the completion of a continuous series of cycles.

A more specific object is to provide an improved business machine that is intermittently energized by improved driving means of the character recited in the previous object, which makes efficient and highly acceptable use of an induction motor as a power source for the machine.

Another object is to provide an improved business machine in which the movements of conventional component parts are utilized in an efficient manner to stop rotation of an intermittently energized driving motor at the end of each operating cycle without decreasing the starting torque of the motor.

Other objects and adantages will become apparent from the following description of the exemplary embodiment of the invention illustrated in the drawings in which:

FIG. 1 is an internal side view of a business machine embodying the invention, the component parts illustrated being shown in the positions occupied in the interval between successive operating cycles; and FIG. 2 is a fragmentary view similar to FIG. 1 in which the component parts are shown in the positions occupied while an operating cycle is in progress.

As illustrated in the drawings, the present invention is incorporated into a calculating machine 10 similar to that shown in United States patent to Oscar J. Sundstrand, No. 2,834,542. As a matter of fact, FIGS. 1 and 2 of the present application are patterned after FIG. 44 of the Sundstrand patent.

The fragmentary portion 12 of the calculating mechanism which appears in the drawings of the present application is merely illustrative of those calculating mechanisms which operate in cycles largely independent of each other. For a complete disclosure of the calculating mechanism 12 which is illustrated only in part in FIGS. 1 and 2, reference may be made to the previously mentioned Sundstrand patent.

Each individual operating cycle of the calculating mechanism 12 is powered by an electric motor 14 connected to the calculating mechanism through a standard transmission 16, which includes a single revolution clutch 18.

A rotary disc 20 forming the driven member of the single revolution clutch 18 is connected by a link 22 to the projecting end of a radial arm 24 on the main shaft 26 of the machine 10 in such a manner that the main shaft is swung from a starting position through a substantial angle and returned in the opposite direction to its starting position when the disc 20 makes a single complete turn from its starting position shown in FIG. 1. This is a conventional linkage which causes the calculating mechanism 12 operated by the main shaft 26 to go through a complete cycle when the disc 20 is rotated one complete turn.

The motor 14 is connected through an enclosed speed reducing gear train 28 with a ratchet wheel 30 forming the driving member of the clutch 18. Normally the motor 14 is deenergized and the driving member 30 of the clutch 18, like the driven member 20, is stationary.

When the machine 10 is triggered to go through an operating cycle, the motor 14 is energized and the driving clutch member 30 is clutched to the driven clutch member 20 by conventional control means which is fully disclosed in the previously mentioned Sundstrand patent. The control structure used for this purpose, which is shown only in part in the present application, includes a switch (not shown) which is closed to energize the motor 14. A transverse shaft 32 forming a part of the control structure which triggers operation of the machine is turned counterclockwise, FIG. 1, through a small angle, to move the bell crank 38 clockwise to the position shown in FIG. 2, when the machine is triggered to go through an operating cycle. The bell crank 38 is held in this position, as well as in its normal position, by a detent 41.

A radial arm 34 on the control shaft 32 connects through a pin 31 with one arm 36 of a three-armed clutch trip lever or crank 38, which is supported by a medial pivot 40 on the frame 42 of the machine. A detent 41 is biased by a spring 47 into engagement with a stud 43 on the lever 38 to hold the latter in either of its two positions, the rest position shown in FIG. 1, or the trip position shown in FIG. 2. Clockwise pivotal movement, FIG. 1, of the trip lever 38, effected by counterclockwise movement of the control shaft 32, disengages, FIG. 2, a positive stop arm 44 of the trip lever from a dog 46 pivoted on the clutch disc 20. A spring 48 swings the dog 46 into engagement with the ratchet wheel 30 to clutch the disc 20 to the ratchet wheel and start the machine through its operating cycle.

As the driven disc 20 nears the end of a complete revolution, a stud 50 on the disc engages a cam arm 52 of the trip lever 38 to swing the trip lever back to its starting position in which the positive stop arm 44 engages the dog 46 to swing the latter away from the ratchet wheel 30 and into engagement with a positive stop lug 54 on the driven disc 20. This action positively stops the driven disc 20 when it has reached its starting or home position after completing a single revolution.

Retrograde or reverse movement of the driven disc 20 from its home position is restrained by a bellcrank cam follower 56 medially pivoted on the machine frame 42. One leg of the bellcrank 56 carries a cam follower roller 58 which is biased radially against a circumferential cam surface 60 on the periphery of the disc 20 by a spring 62 connected with the other leg of the bellcrank.

The peripheral cam surface 60 on the disc 20 is shaped to allow the cam follower roller 58 to move radially inward behind a steep dip 64 in the cam surface as the disc completes its movement into its home position. Inward movement of the follower roller 58 is limited by an eccentric 66 which engages the leg of the bellcrank 56 connected to the spring 62.

With the exception of the motor 14, the component structure of the machine 10 as described up to this point was developed and used in this environment prior to the present invention. As previously intimated, a complete disclosure of machine components not necessarily illustrated or described in the present application can be obtained by reference to the Sundstrand patent.

In accordance with the present invention, the inherent operating movements of the structure used to control the transmission 16, including the single revolution clutch 20, are utilized by extremely simple, economical drive control structure to provide a highly efficient and eminently satisfactory energization of the transmission from a motor 14 which can be designed primarily to provide the power necessary for operating the machine without troublesome limitations on the permissible size of the motor or mass of its rotor. As will presently appear, the result is to provide an extremely practical and highly acceptable usage in this particular environment of an induction motor, which must necessarily have a rotor of larger inertia than an externally powered wound rotor motor of the same power capacity.

The motor 14 used to energize the operating cycles of the machine 10, therefore, can be an induction motor of a standard design having any size necessary to produce all the power that can be used effectively in operating the machine. As previously mentioned, this motor is connected in a conventional manner to drive the transmission 16.

Due to the relatively large mass or inertia of its rotor (not shown) the induction motor 14 has a tendency to coast to an unacceptable degree after disengagement of the single revolution clutch 18. It will be understood that the electrical control (not shown) which electrically energizes the motor 14 at the beginning of an operating cycle of the machine also deenergizes the motor upon completion of an operating cycle.

The tendency which the motor 14 would otherwise have to coast after completion of an operating cycle is effectively suppressed by a brake which is controlled in an extremely efficient manner by the previously mentioned movements of the conventional transmission control structure.

Preferably, the braking action which eliminates undesirable coasting of the motor is provided by a flexible brake strap or band 68 anchored at one end to a stud 70 on the machine frame 42 and trained over a drum 72 mounted on a shaft 74 which is driven directly from the motor 14. It is noteworthy that the drum 72 rotates in a direction (clockwise) which tends to tighten the brake band 68 around the drum. It has been found that a strap of leather makes a very satisfactory brake band for this purpose.

The brake thus formed is applied by applying tension to the end of the band 68 opposite the anchor 70. Conversely, the brake is released by slackening the band from the end opposite the anchor 70.

Extremely economical control structure is used to release the motor brake simultaneously with engagement of the single revolution clutch 18 and to firmly reapply the brake simultaneously with the completion of the rotary movement of the driven member 20 of the clutch. More particularly, the brake is released as the trip lever 38 swings clockwise to engage the clutch 18. This makes the full power of the motor 14 available for operating the machine from the very beginning of its operating cycle. Moreover, the brake is maintained in released condition until the rotary movement of the driven disc 20 is completed even though the trip lever 38 is swung back to its starting position by the stud 50 before the disc 20 reaches its home position, at which instant the brake is again fully applied.

This action of the brake is achieved by dual control elements, one of which is operated by the trip lever 38 and the other of which is actuated by the cam follower lever 56, which restrains the disc 20 against reverse movement from its home position.

The first control element for the brake is formed by a stud 76 on one end of an elongated brake lever 78, which is swingably supported on the frame 42 by a medial pivot 80. The opposite end of the brake lever 78 is bifurcated to embrace a stud 82 on the positive stop arm 44 of the trip lever 38. The brake control stud 76 is connected to the free end of the brake band 68 by a tension spring 84. Thus as shown in FIG. 2, clockwise swinging movement of the trip lever 38 which engages the clutch 18 swings the brake lever 78 counterclockwise to move the control element 76 in a direction which creates slack in the brake band 68.

The second brake control element is formed by a stud 86 supported on the leg of the bell crank 56 which carries the cam follower roller 58. As shown this stud 86 is supported on the bellcrank 56 by an auxiliary plate 88 spot welded to the bellcrank. This eliminates any necessity for modifying the structure of the bellcrank, as such. As shown in the drawing, the portion of the brake band 68 between the drum 72 and the tension spring 84 is trained around the side of the second brake control stud 86 adjacent the cam disc 20.

As the cam disc 20 turns away from its starting position after the brake has been initially released as an incident to engagement of the single revolution clutch, the cam follower roller 58 is moved radially outward by the cam surface 60, which rises gradually from the inner extremity of the cam surface dip 64. The attendant movement of the second brake control 86 carries the latter away from its starting position in a direction which will produce slack in the brake band 68.

As the cam follower 58 will still be somewhat short of the dip or ledge 64 in the cam surface when the trip lever 38 is shifted back to its starting position by the stud 50, the second brake control 86 will remain in its displaced or brake releasing position after the first brake control element 76 has returned to its normal or brake applying position. Since the brake band 68 is trained around both the brake drum 72 and the second control element 86, the band will remain slack until the single revolution of the clutch 18 is completed, at which instant the bellcrank 56 and its brake control element 86 return to their normal positions. Then the two brake control elements 76 and 86 act together to fully apply the brake to the drum to quickly and effectively suppress rotation of the motor 14. The result is to eliminate undesirable coasting of the motor even though it has the relatively large rotary moment of inertia characteristic of induction motors. Moreover, application of the brake dampens and eliminates sound from the motor 14 from the instant the brake is applied.

It will be appreciated that the action of this brake control structure in effectively suppressing coasting of the motor 14 while at the same time making the full torque capacity of the motor available for driving the machine throughout each operating cycle is achieved purely as an incident to the inherent movements of the conventional transmission control components of the machine. The only modification made in the trip lever 38 is the addition of the stud 82 to the arm 44 of the lever. The restraining bellcrank 56 is modified only in that the brake control support plate 88 is spot welded to this lever in the manner described. The brake components, including the brake lever 78, are of extremely economical construction.

While I have shown a preferred embodiment of my invention, it will be apparent that variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. In a business machine, the combination of an intermittently driven shaft, high inertia driving motor, a transmission connected between said driving motor and said shaft and including a single revolution clutch having a driving end connected to said motor and a driven end connected to said shaft, a brake drum connected for rotation by said driving motor, operating means for said clutch including a clutch control element movable between a clutch engaging position in which said control element effects an engagement of said clutch and a clutch disengaging position in which said element effects a disengagement of said clutch, operating means coacting with said control element to move the latter to said clutch engaging position thereof, means on said driven element of said clutch coacting with said clutch control element to move the latter from said clutch engaging position to said clutch disengaging position while said driven element is rotating after engagement of said clutch but before said driven element has completed a single revolution, a first brake control element connected with said clutch control element for movement by the latter between a brake releasing position and a brake applying position as an incident to movement of said clutch control element between said clutch engaging and said clutch disengaging positions respectively, a second brake control element coacting with said clutch driven member for movement by the latter from a brake applying position to a brake releasing position as an incident to rotation of said driven member from a starting position and for movement from said brake releasing position back to said brake applying position as an incident to return of said driven member to said starting position thereof, and a brake band trained over said drum and engaged with said first and second brake control elements to be tensioned when both brake control elements are in said brake applying positions thereof and slackened for effective release from said drum when either of said brake control elements is in said brake release position thereof.

2. In a business machine having a main shaft, the combination of a driving motor, a transmission for connecting said driving motor to the main shaft and including a component movable from a starting position through an operating cycle back to said starting position, a control element for said transmission movable between an energizing position and a deenergizing position, a first brake control element connected with said transmission control element for movement between a brake release position and a brake applying position as an incident to movement of said transmission control element to said energizing position and said deenergizing position respectively, a second brake control element coacting with said transmission component for movement to a brake applying position when said transmission component is in said starting position thereof and movement to a brake releasing position when said transmission component is displaced away from said starting position thereof, a brake coacting with said driving motor, and means connecting said brake with said first and second brake control elements to effectively apply said brake when both said brake control elements are in said brake applying positions thereof and to release said brake when either of said brake control elements is in its brake releasing position.

3. In a business machine, the combination of a driving motor, a power transmission connected to said driving motor for driving the machine and including a component movable from a starting position through an operating cycle back to said starting position, a brake drum connected with said motor, first and second brake control elements, a brake band trained over said drum and coacting with both said first and second brake control elements, a transmission control element coacting with said transmission and movable between a transmission energizing position and a transmission deenergizing position, means connecting said transmission control element to said first brake control element to move the latter to a brake release position which produces slack in said brake band as an incident to movement of said transmission control element to said energizing position thereof and to move said first brake control element to a brake applying position which reduces slack in said brake band as an incident to movement of said clutch control element to said deenergizing position thereof, means connecting said transmission component to said second brake control element to move the latter to a brake applying position which reduces slack in said brake band as an incident to movement of said transmission component to said starting position thereof and to move said second brake control element to a brake release position which produces slack in said brake band as an incident to displacement of said transmission component away from said starting position thereof, and said brake band being dimensioned so that the latter is tensioned around said drum when both said first and second brake control elements are in said brake applying positions thereof and slackened for effective release from said drum when either of said first or second brake control elements is in said brake releasing position thereof.

4. In a business machine, the combination of a driving motor, power transmission means connected to said driving motor, a machine control element movable between an energizing position and a deenergizing position, a first brake control element connected with said machine control element for movement between a brake release position and a brake applying position as an incident to movement of said machine control element to said energizing position and said deenergizing position respectively, a second brake control element connected with said machine control element for movement away from a brake applying position to a brake releasing position and back to said brake applying position as an incident to movement of said machine control element through an operating cycle thereof, a brake coacting with said driving motor, and means connecting said brake with said first and second brake control elements to effectively apply said brake when both said brake control elements are in said brake applying positions thereof and to release said brake when either of said brake control elements is in said brake releasing position thereof.

5. For use in driving a business machine, an electric motor, a part driven directly by said motor, a friction brake cooperative with said part to inhibit coasting of the motor after the machine has completed an operating cycle and the motor has been deenergized, a one revolution clutch mechanism connected to the motor and having a driven member for connection to an operating element of the machine, a pair of cumulatively effective elements to apply the friction brake only when both elements are moved to brake applying positions, a part for controlling engagement and disengagement of the one revolution clutch mechanism, means operated by the part to move one of said elements to brake applying position as the part is moved to clutch disengaging position, and means controlled by the driven member to move the other of said elements toward brake applying position prior to completion of an operating cycle.

References Cited in the file of this patent

UNITED STATES PATENTS

| | | |
|---|---|---|
| 1,178,438 | Allard | Apr. 4, 1916 |
| 1,184,555 | Miller | May 23, 1916 |
| 1,422,640 | Valois | July 11, 1922 |
| 2,573,022 | Homan | Oct. 30, 1951 |
| 2,669,331 | Dudis et al. | Feb. 16, 1954 |